US011770851B2

(12) United States Patent
Zhang et al.

(10) Patent No.: US 11,770,851 B2
(45) Date of Patent: Sep. 26, 2023

(54) SYNCHRONIZED SPECTRUM SHARING ACROSS MULTIPLE ADJACENT CARRIERS

(71) Applicant: QUALCOMM Incorporated, San Diego, CA (US)

(72) Inventors: Xiaoxia Zhang, San Diego, CA (US); Tamer Kadous, San Diego, CA (US); Taesang Yoo, San Diego, CA (US); Yisheng Xue, San Diego, CA (US); Arumugam Chendamarai Kannan, San Diego, CA (US); Jing Sun, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 889 days.

(21) Appl. No.: 16/430,095

(22) Filed: Jun. 3, 2019

(65) Prior Publication Data
US 2019/0380147 A1 Dec. 12, 2019

Related U.S. Application Data

(60) Provisional application No. 62/681,465, filed on Jun. 6, 2018.

(51) Int. Cl.
*H04W 74/08* (2009.01)
*H04L 27/26* (2006.01)
(Continued)

(52) U.S. Cl.
CPC ..... *H04W 74/0808* (2013.01); *H04L 27/2666* (2013.01); *H04W 16/14* (2013.01); *H04W 72/0446* (2013.01)

(58) Field of Classification Search
CPC ............. H04W 74/0808; H04W 16/14; H04W 72/0446; H04L 27/2666
(Continued)

(56) References Cited

U.S. PATENT DOCUMENTS

2009/0275294 A1* 11/2009 Callaway, Jr. ........ H04W 16/14
455/120
2011/0019634 A1* 1/2011 Fujii ..................... H04W 16/14
370/329
(Continued)

OTHER PUBLICATIONS

Intel Corporation: "Discussion on Backhaul Signaling and Inter-eNB Measurements to Support DL-UL Interference Mitigation Schemes", 3GPP Draft; R1-132392—Intel—eNB Measurements, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 20, 2013-May 24, 2013, May 11, 2013, XP050698156, 5 pages, Retrieved from the Internet: URL: https://www.3gpp.org/ftp/tsg_ran/WG1_RL1/TSGR1_73/Docs.
(Continued)

*Primary Examiner* — Chi Tang P Cheng
(74) *Attorney, Agent, or Firm* — Haynes and Boone, LLP

(57) ABSTRACT

Wireless communications systems and methods related to communicating in a frequency band across multiple adjacent carriers are provided. A first wireless communication device performs first sensing in a first sensing time designated for a first channel, the first channel being an operational channel of the first wireless communication device. The first wireless communication device performs second sensing in a second sensing time designated for a second channel adjacent to the first channel, the second channel being an operational channel of a second wireless communication device. The first wireless communication device communicates with a third wireless communication device in the first channel a communication signal in the first channel based on the first sensing and the second sensing.

26 Claims, 10 Drawing Sheets

(51) Int. Cl.
*H04W 72/0446* (2023.01)
*H04W 16/14* (2009.01)
(58) Field of Classification Search
USPC .......................................................... 370/329
See application file for complete search history.

(56) References Cited

U.S. PATENT DOCUMENTS

| | | |
|---|---|---|
| 2012/0182886 A1* | 7/2012 | Ong .................. H04W 74/0816 370/252 |
| 2014/0295867 A1 | 10/2014 | Newton et al. |
| 2015/0103706 A1 | 4/2015 | Li et al. |
| 2017/0111952 A1* | 4/2017 | Choi ..................... H04L 5/0048 |
| 2018/0103472 A1 | 4/2018 | Zhang et al. |
| 2018/0343688 A1 | 11/2018 | Nakamura et al. |

OTHER PUBLICATIONS

International Search Report and Written Opinion—PCT/US2019/035427—ISA/EPO—dated Sep. 9, 2019.
QUALCOMM: "Synchronized Spectrum Sharing across Multiple Adjacent Carriers", Meridian SYS, May 14, 2018, 12 pages.
Zhang X., "Synchronized Spectrum Sharing across Multiple Adjacent Carriers", Background Information, Created on May 19, 2018, 3 pages.

* cited by examiner

SYNCHRONIZED SPECTRUM SHARING ACROSS MULTIPLE ADJACENT CARRIERS

CROSS REFERENCE TO RELATED APPLICATIONS

The present application claims priority to and the benefit of U.S. Provisional Patent Application No. 62/681,465, filed Jun. 6, 2018, which is hereby incorporated by reference in its entirety.

TECHNICAL FIELD

This application relates to wireless communication systems, and more particularly to accessing a frequency spectrum shared across adjacent network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the Long Term Evolution (LTE) technology to a next generation new radio (NR) technology. For example, NR may operate over a wider bandwidth (BW) at higher frequencies than LTE. In addition, NR introduces the concept of BWPs, where a BS may dynamically configure a UE to communicate over a portion of a network system BW instead of over the entire network system BW. The use of BWPs can provide several benefits, such as reducing UE BW capability requirements, reducing power consumptions at UEs, reducing signaling overheads, and/or allowing for load balancing within a component carrier (CC), despite the wider network system BW. Further, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to one or more channels (e.g., frequency subbands) within the frequency spectrum. Depending on the LBT result, the transmitting node may access one or more channels. In some instances, the transmitting node may listen to different channels depending on whether the LBT is for an uplink (UL) channel access or for a downlink (DL) channel access. The different channel access BWs may require different guard bands for interference protection against transmissions in adjacent channels, for example, by nodes of a different network operating entity.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes performing, by a first wireless communication device, first sensing in a first sensing time designated for a first channel. The first channel is an operational channel of the first wireless communication device. The method also includes performing, by the first wireless communication device, second sensing in a second sensing time designated for a second channel adjacent to the first channel. The second channel is an operational channel of a second wireless communication device. The method further includes communicating, by the first wireless communication device with a third wireless communication device in the first channel, a communication signal in the first channel based on the first sensing and the second sensing.

In an additional aspect of the disclosure, an apparatus includes a transceiver configured to perform first sensing in a first sensing time designated for a first channel, the first channel being an operational channel of a first wireless communication device. The transceiver is also configured to perform second sensing in a second sensing time designated for a second channel adjacent to the first channel, the second channel being an operational channel of a second wireless communication device. The transceiver is further configured to communicate, with a third wireless communication device in the first channel, a communication signal in the first channel based on the first sensing and the second sensing.

In an additional aspect of the disclosure, a computer-readable medium having program code recorded thereon, the program code includes code for causing a first wireless communication device to perform first sensing in a first sensing time designated for a first channel, the first channel being an operational channel of the first wireless communication device; code for causing a first wireless communication device to perform second sensing in a second sensing time designated for a second channel adjacent to the first channel, the second channel being an operational channel of a second wireless communication device; and code for causing the first wireless communication device to communicate, with a third wireless communication device in the first channel, a communication signal in the first channel based on the first sensing and the second sensing.

In an additional aspect of the disclosure, an apparatus including means for performing first sensing in a first sensing time designated for a first channel, the first channel being an operational channel of a first wireless communication device; means for performing second sensing in a second sensing time designated for a second channel adjacent to the first channel, the second channel being an operational channel of a second wireless communication device; and means for communicating, with a third wireless communication device in the first channel, a communication signal in the first channel based on the first sensing and the second sensing.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
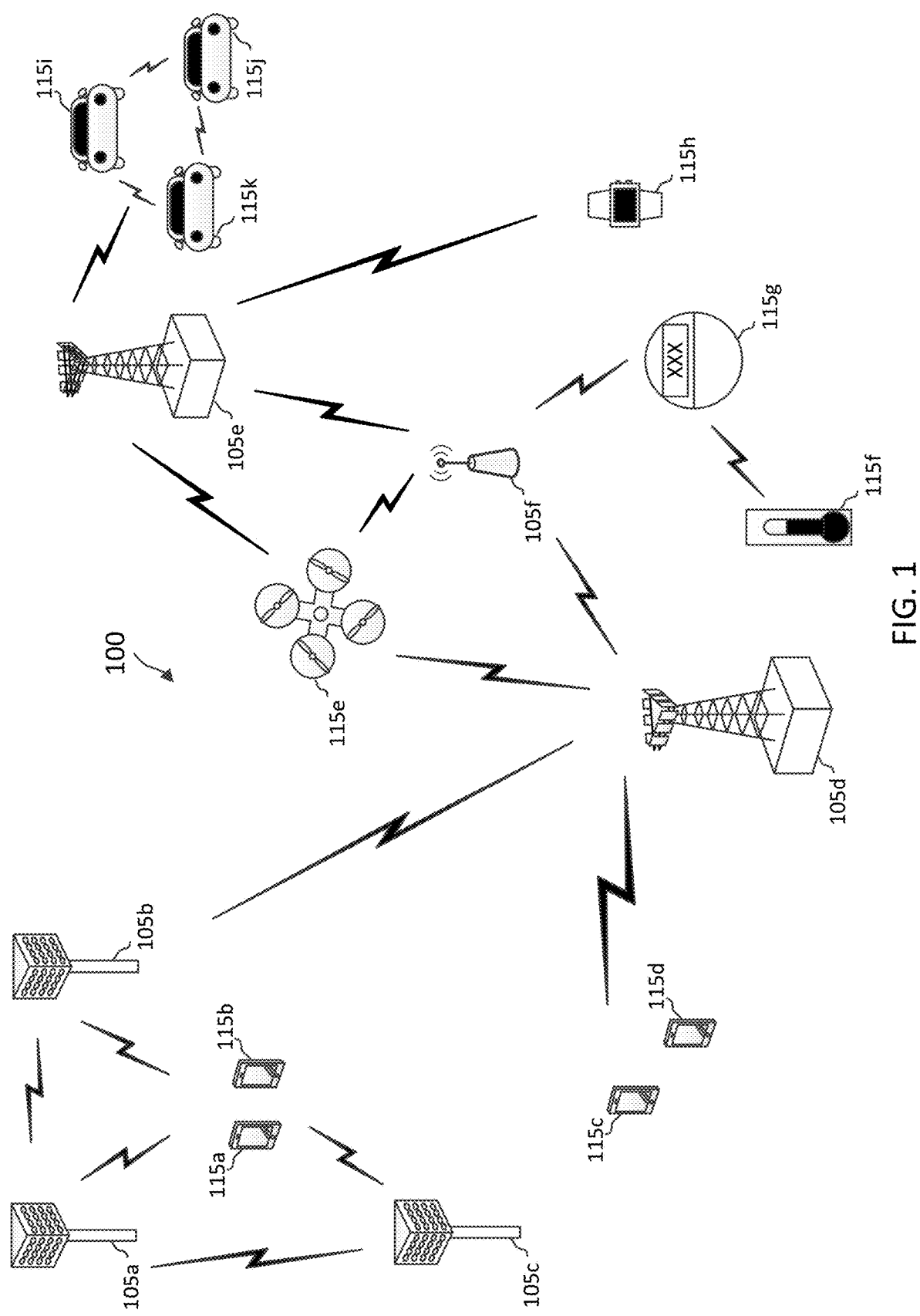
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100 + Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time-division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 illustrates a wireless communication network 100 according to embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for DL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

A wireless communications system may operate over a shared spectrum, meaning that the wireless communications system includes one or more frequency bands that may be shared by multiple network operating entities. The shared spectrum may include an unlicensed spectrum and/or licensed spectrum. In some instances, multiple network operating entities may share their licensed spectrum with each other to better utilize the spectrum. In some other instances, multiple network operating entities may obtain a licensed spectrum together.

The network 100 may partition the frequency band into multiple channels, for example, each occupying about 20 megahertz (MHz). In an embodiment, the network 100 may operate over a shared frequency band or an unlicensed frequency band, for example, at about 3.5 gigahertz (GHz), sub-6 GHz or higher frequencies. Channel access in the frequency band may be in units of channels. Use of the available band spectrum may then be subject to a contention procedure that may involve the use of a medium-sensing procedure. For example, to avoid interference between different devices or between devices operated by different network operating entities, the wireless communications system may employ medium-sensing procedures, such as a listen-before-talk (LBT) procedure, to ensure a particular channel is clear before transmitting a message. For example, the BSs 105 and the UEs 115 may be operated by multiple network operating entities sharing resources in the shared communication medium and may employ LBT to reserve transmission opportunities (TXOPs) in the share medium for communications. Each TXOP includes one or more medium sensing periods. The BS or the UE may access one or more of the channels based on the result of the LBT. In a priority-based spectrum sharing scheme, a shared spectrum is time-partitioned into TXOPs. Each TXOP is designated for prioritized use by a high priority network operating entity and opportunistic use by low priority network operating entities based on reservations.

The present application describes spectrum access mechanisms in a spectrum shared by multiple adjacent carriers. In a typical TDD deployment, the same TDD DL/UL configurations are applied to avoid adjacent channel interference. Accordingly, network operating entities operating in adjacent channels align their DL/UL transmission directions, even though these two different network operating entities are operating on different channels. Unfortunately, the aligned TDD configurations may be fairly restrictive, as different nodes/network operating entities may have different traffic patterns from each other.

An alternative to implementing aligned TDD configurations involves providing a guard band between the adjacent channels to provision for different TDD DL/UL configurations. In this example, network operating entities operating on adjacent channels may transmit without regard to data transmission alignment. Guard bands are included at edges of a channel BW to mitigate interference from simultaneous transmissions in adjacent channels. In an example, the frequency band may have a channel BW corresponding to a first BW, a second BW, and a third BW. In the scenario, a channel access may be over the first BW of about 20 MHz, for example, including about 256 resource elements (REs) (e.g., subcarriers with SCS of about 78.125 kHz). A communication signal may be transmitted in a usable portion of the first BW excluding the guard bands. Channel accesses in a shared frequency band or an unlicensed frequency band may have different BWs depending on LBT results. Unfortunately, significant spectrum inefficiency could be incurred due to the large guard band.

The present disclosure provides techniques to reduce interference while mitigating the usage of the aligned TDD configurations and/or large guard band when multiple network operating entities share adjacent channels. Depending on the node separation and the associated interference, it is possible for the transmission links to be in different directions and to coexist between adjacent channels, without a large guard band overhead. Accordingly, the disclosed embodiments provide several benefits.

Figure 2:
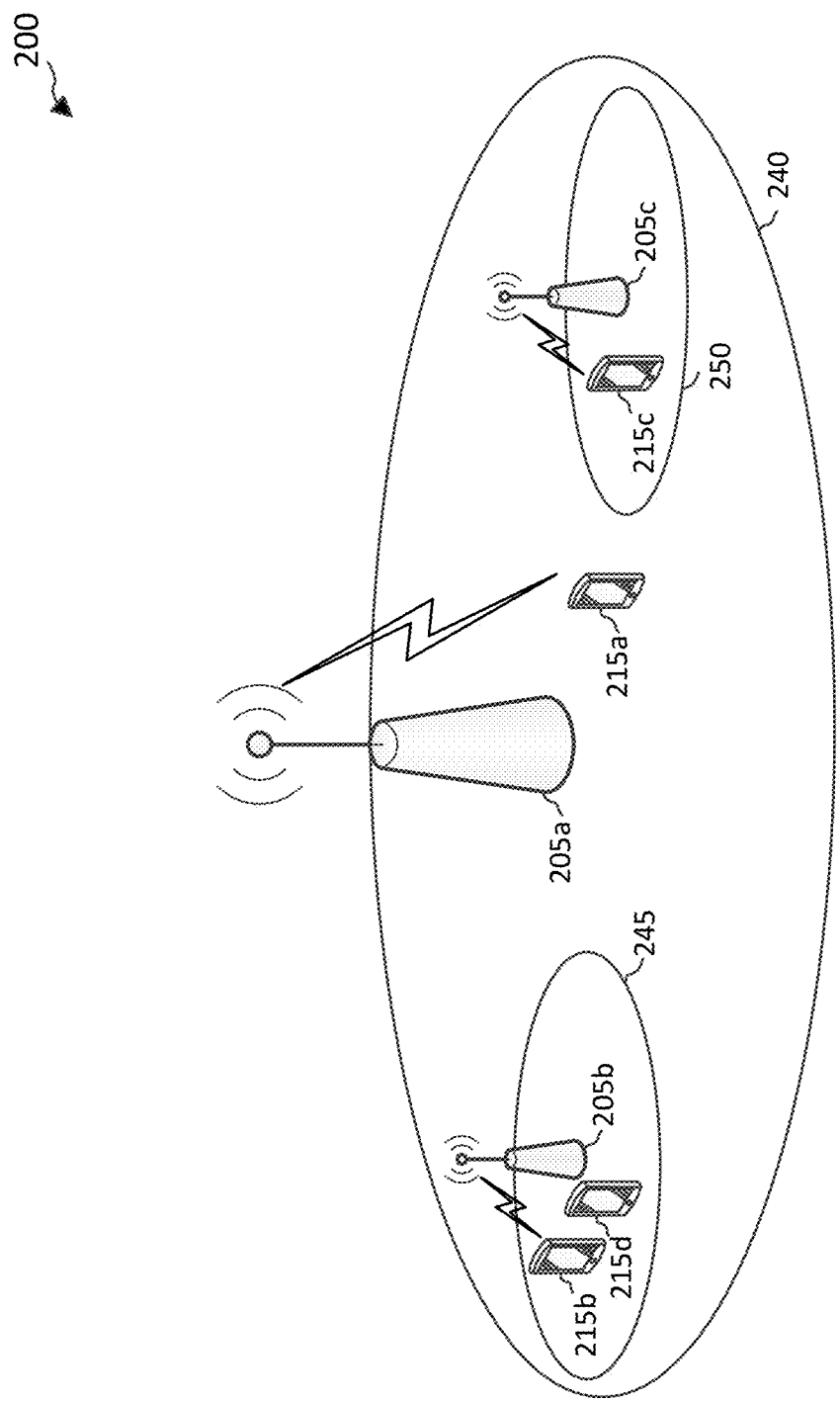
FIG. 2 illustrates an example of a wireless communications network that supports priority-based spectrum access according to embodiments of the present disclosure.

FIG. 2 illustrates an example of a wireless communications network 200 that supports priority-based spectrum access according to embodiments of the present disclosure. The network 200 may be similar to the network 100. FIG. 2 illustrates three BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UEs 215b and 215d in a pico cell 245 within a coverage area of the macro cell 240. The BSs 205c serves the UE 215c in another pico cell 250 within the coverage area of the macro cell 240. The BSs 205 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different access priorities for accessing the spectrum to minimize interference. For example, the BS 205a and the UE 215a may be treated as one network operating entity (e.g., Operator A), the BS 205b and 205c and the UEs 215b-d may be treated as another network operating entity (e.g., Operator B). While FIG. 2 is illustrated with pico cells and macro cells, in some embodiments, different network operating entities may operate across different across different cells. In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner.

The present disclosure provides teachings for extending LBT across multiple operators sharing adjacent channels. Nodes operating on the same channel may monitor request-to-transmit (RTS) and clear-to-transmit (CTS) signals from both the BS and the UE. Accordingly, the protection may be on both UL and DL link directions.

In some embodiments, a first wireless communication device performs first sensing in a first sensing time designated for a first channel, the first channel being an operational channel of the first wireless communication device. The sensing may also be referred to as medium sensing, sensing a medium, or listening for a signal. In an example, the first wireless communication device may correspond to a BS1 that senses the medium at a time T1 designated for a channel C0. BS1 and BS2 share channel C0, and BS1 may listen for a request-to-transmit (RTS) signal from BS2. In another example, the first wireless communication device may correspond to a UE1 that senses the medium at a time T1 designated for a channel C0. UE1 and UE2 share channel C0, and UE1 may listen for a CTS signal from UE2.

Additionally, the first wireless communication device performs second sensing in a second sensing time designated for a second channel adjacent to the first channel, the second channel being an operational channel of a second wireless communication device. In an example, the first wireless communication device may correspond to BS1 that senses the medium at a time T2 designated for channel C1, which is adjacent to the channel C0. The second wireless communication device may be BS3, and B1 may listen for an RTS signal from BS3. In another example, the first wireless communication device may correspond to UE1 that senses the medium at a time T2 designated for channel C1, which is adjacent to the channel C0. The second wireless communication device may be UE3, and UE1 may listen for a CTS signal from UE3.

Additionally, the first wireless communication device communicates, with a third wireless communication device in the first channel, a communication signal in the first channel based on the first sensing and the second sensing. In an example, the first wireless communication device may correspond to BS1 that senses the medium at a time T2 designated for channel C1, which is adjacent to the channel C0. The second wireless communication device may be BS3, and B1 may listen for an RTS signal from BS3. In another example, the first wireless communication device may correspond to UE1 that senses the medium at a time T2 designated for channel C1, which is adjacent to the channel C0. The second wireless communication device may be UE3, and UE1 may listen for a CTS signal from UE3.

Figure 3:
FIG. 3 illustrates a priority-based adjacent channel sharing scheme according to embodiments of the present disclosure.

FIG. 3 illustrates a priority-based adjacent channel sharing scheme 300 according to embodiments of the present disclosure. The x-axis represents frequency in some constant units. The y-axis represents time in some constant units. The scheme 300 may be employed by the network 100. In particular, a BS 105 or UE 115 may employ the scheme 300 to extend LBT across multiple operators sharing adjacent channels. While the scheme 300 illustrates coordinated spectrum access for three different network operating entities (e.g., Operator A, Operator B, and Operator C) operating on adjacent channels, the scheme 300 can be applied to any suitable number of network operating entities.

The scheme 300 partitions the frequency band 304 into a plurality of channels 306 as shown in the channel configuration 302. The frequency band 304 and the channels 306 may have any suitable BWs. As an example, the frequency band 304 may have a BW of about 80 MHz and may be partitioned into about four channels 306, where each channel 306 may have a BW of about 20 MHz. The channels 306 are shown as channels C0, C1, C2, and C3. Operators A and B operate on C0, and operators C and D (not shown) operate on channel C1. Each of the operators may listen for a reservation signal (e.g., including a predetermined preamble signal) on its channel using a medium sensing slot 350 to gain access to a TXOP. Each TXOP includes one or more medium sensing slots 350 that may be followed by a transmission period (not shown).

Access to the medium is based upon priority among the operators and/or channels. Priorities of the network operating entities may rotate (e.g., in a round-robin fashion) among TXOPs. A TXOP may have a fixed duration and may be defined in units of OFDM symbols, subframes, slots, and/or any suitable time format.

Each medium sensing slot 350 is assigned to a particular network operating entity (e.g., Operator A or Operator B). The assigned network operating entity may transmit an RTS in the medium sensing slot 350 to reserve the following transmission period for communications. In the scheme 300, a medium sensing slot 350 includes an RTS, gap 326, CTS, and gap 328. The medium sensing periods can be arranged in a decreasing order of priorities. Thus, a low priority operator node can monitor the channel (e.g., the shared spectrum) in the medium sensing slots of higher priorities. Upon detection of a reservation from a high priority operator node, the low priority operator node may refrain from transmitting in the following transmission period. A medium sensing slot and the transmission period may have fixed durations. For example, each medium sensing slot 350 may include one or more OFDM symbols, and each transmission period may include one or more subframes. The network operating entities may be time-synchronized when operating in the adjacent channels.

At a moment of time, among channels C0 and C1, channel C0 has higher priority than channel C1. Additionally, on channel C0, operator A has higher priority than operator B. On channel C1, operator C may have a higher priority than another operator operating on the channel C1 (e.g., operator D, which is not shown). Operator A transmits an RTS 322 and a CTS 324 that allows operators B and C to listen via a medium sensing slot. Operator C operates on channel C1. If operator C does not detect an RTS/CTS from channel C0, operator C may transmit an RTS 332 and a CTS 334 on channel C1 that allows operator B to listen. After operator C, priority may move on to the next operator and/or channel. By listening to medium sensing slot 350, a low priority operator that hears a signal from a high priority operator may yield or perform some action, which will be further explained in the present disclosure.

In an example, BS A1 associated with operator A performs a first sensing in a first sensing time designated for channel C0. The channel C0 is an operational channel of BS A1 and BS B1, which is associated with an operator B. Additionally, BS A1 performs a second sensing in a second sensing time designated for channel C1, which is adjacent to channel C0. The channel C1 is an operational channel of BS C1. The BS A1 communicates with UE A1 in channel C0, a communication signal in channel C0 based on the first sensing and the second sensing. The communication signal may be a PBCH signal, a Physical Downlink Control Channel (PDCCH) signal and/or a Physical Downlink Shared Channel (PDSCH) signal for DL, or a Physical Uplink Control Channel (PUCCH) signal or PUSCH signal for UL.

In another example, UE A1 associated with operator A performs a first sensing in a first sensing time designated for channel C0. The channel C0 is an operational channel of UE A1 and UE B1, which is associated with an operator B. Additionally, UE A1 performs a second sensing in a second sensing time designated for channel C1, which is adjacent to channel C0. The channel C1 is an operational channel of UE C1. The UE A1 communicates with BS A1 in channel C0, a communication signal in channel C0 based on the first sensing and the second sensing. The communication signal may be a PBCH signal, a PDCCH signal and/or a PDSCH signal for DL, or a PUCCH signal or PUSCH signal for UL.

In the scheme 300, signal detection can be performed on the same channel while energy detection is expected on another channel or the node may also perform energy/signal detection on the other channel. A gap 328 between the transmission of an RTS and CTS prevents or mitigates DL to UL leakage.

Additionally, between the RTS and the CTS, a gap 326 covers both the DL/UL switching and processing time. In an example, gap 326 includes the processing time for the UE, which is in the DL mode, to receive and decode the RTS and also to switch to the UL mode to transmit the CTS.

Figure 4:
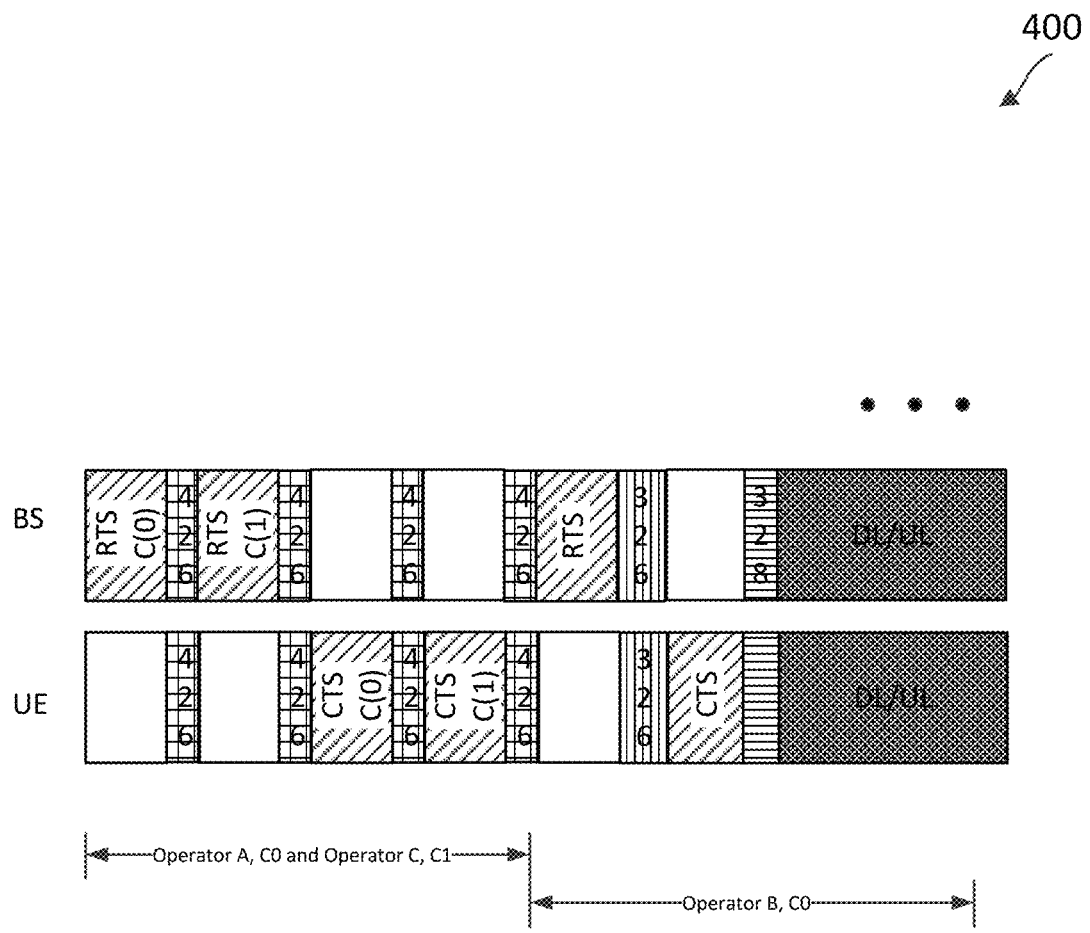
FIG. 4 illustrates a priority-based adjacent channel sharing scheme according to embodiments of the present disclosure.

FIG. 4 illustrates a priority-based adjacent channel sharing scheme 400 according to embodiments of the present disclosure. The scheme 400 may be employed by the network 100. In particular, a BS 105 or UE 115 may employ the scheme 400 to extend LBT across multiple operators sharing multiple adjacent channels. While the scheme 400 illustrates coordinated spectrum access for three different network operating entities (e.g., Operator A, Operator B, and Operator C) operating on adjacent channels, the scheme 400 can be applied to any suitable number of network operating entities.

The scheme 400 includes the transmission and detection of RTS and CTS signals for allowing an operator to process the signals. The scheme 400 reduces the gap 326 (see also FIG. 3) across multiple channels to minimize sensing overhead. The BS and the UE may belong to different power classes, and thus it may be sufficient for nodes operating on adjacent channels to monitor BS-to-BS and/or UE-to-UE interference for adjacent crosslink direction, without regard for BS-to-UE and UE-to-BS signaling.

Crosslink interference may occur as a result of the differing transmission directions in adjacent channels for network operating entities. For example, adjacent crosslink interference may be present if a first BS operating on a first channel transmits data, and a second BS operating on a second channel adjacent to the first channel receives data. Similarly, adjacent crosslink interference may be present if a first UE operating on a first channel transmits data, and a second UE operating on a second channel adjacent to the first channel receives data.

In some examples, the BS and/or UE may detect energy or particular signals on an adjacent channel. In some examples, the BS performs signal detection from another BS on the same or adjacent channel (with network listening) while the UE detects energy on the same or adjacent channel. The RTS/CTS signals from high priority nodes may span the edge band to allow for better energy detection on adjacent channels. The leakage from the RTS/CTS signals may provide enough energy on a channel for detection by a node operating on an adjacent channel. In some examples, it may be desirable to detect energy on adjacent channels rather than having operators listen for signals on adjacent channels.

In an example, the scheme 400 implements energy sensing and only monitors BS-to-BS and UE-to-UE signaling and communications across adjacent channels. In other words, a BS listens for the RTS signal from another BS operating on an adjacent channel, but does not listen for a CTS signal from a UE operating on the adjacent channel. Likewise, a UE listens for the CTS signal from another UE operating on an adjacent channel, but does not listen for an RTS signal from a BS operating on the adjacent channel. Accordingly, as shown in the scheme 400, the RTS signals from adjacent channels C0 and C1 (with a DL/UL switching gap 426 in between) may be packed back to back followed by the CTS signals from the adjacent channels (with DL/UL switching gap 426 in between). Gap 426 includes DL/UL switching time, without the processing time included in gap 326. Accordingly, gap 426 is smaller than the gap 326 that covers DL/UL switching and processing (see FIGS. 3 and 4).

The present disclosure provides multiple techniques for synchronized spectrum sharing across multiple adjacent carriers. In an example, if operator A detects a signal or energy from operator B on the same or adjacent channel, the operator A may refrain from transmission. In particular, a low priority node may yield its transmission if an RTS/CTS signal from a higher priority node operating on the same or adjacent channel is detected. In this example, both DL and UL link directions may be protected.

Figure 5:
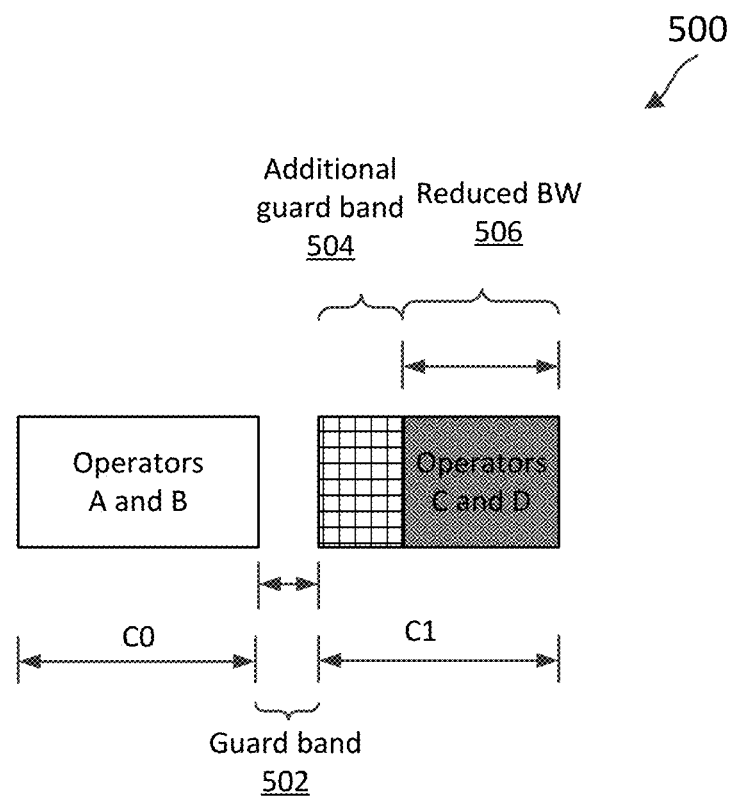
FIG. 5 illustrates a priority-based adjacent channel sharing scheme according to embodiments of the present disclosure.
Figure 6:
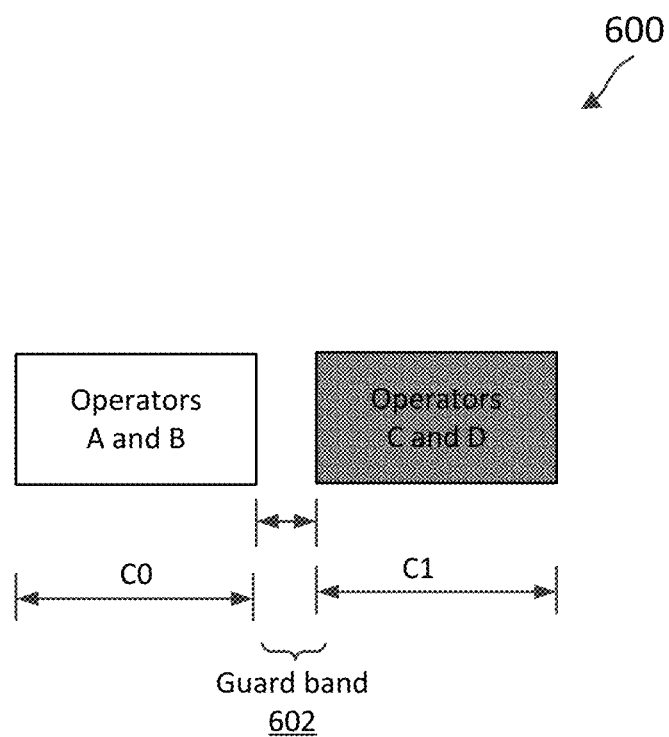
FIG. 6 illustrates a priority-based adjacent channel sharing scheme according to embodiments of the present disclosure.

FIGS. 5-7 illustrate various mechanisms for accessing a shared frequency band or an unlicensed frequency band (e.g., the frequency band) across adjacent channels. In FIGS. 5-7, the x-axes represent frequency in some constant units.

FIG. 5 illustrates a priority-based adjacent channel sharing scheme 500 according to embodiments of the present disclosure. The scheme 500 may be employed by the network 100. In particular, a BS 105 or UE 115 may employ the scheme 500 to extend LBT across multiple operators sharing adjacent channels. While the scheme 500 illustrates coordinated spectrum access for four different network operating entities operating on adjacent channels, the scheme 500 can be applied to any suitable number of network operating entities.

Operators A and B share channel C0, and operators C and D share channel C1. A guard band 502 is included at an edge of channels C0 and C1 to mitigate interference from simultaneous transmissions in the adjacent channels. Operator C or D may detect an RTS or CTS signal from operator A or operator B (e.g., by energy detection or signal detection). The scheme 500 reduces BW transmission on one channel (e.g., channel C1) if nodes from an adjacent channel are detected. In an example, operator C has lower priority than operator A and detects an RTS/CTS signal from operator A. In response, the operator C may transmit using a reduced BW 506. The BW of channel C1 is reduced because an additional guard band 504 is used in the transmission to mitigate the interference. In this example, operator C may schedule this transmission with the reduced BW.

In an example, each of the BWs of channels C0 and C1 is 20 MHz. Operator A may transmit using its full transmission BW of 20 MHz, but operator C may transit using a smaller BW of 10 MHz and allow the additional guard band 504 to use the other 10 MHz. An advantage of the scheme 500 may provide for better spectrum efficiency compared to TDM.

The scheme 500 may reduce BW transmission on other adjacent channels in the presence of crosslink interference. Operators C and D may receive control signals. Based on the control signals, the BS or UE associated with operator C determines how far a data signal will extend into additional guard band 504. Additionally, the BW of the data may change (e.g., can be anywhere from 10-20 MHz). For example, additional guard band 504 may shrink or stretch and may be present in some transmissions, but absent in others. The control signaling for a transmission schedule may reside within the narrowest BW for the worst case. Additionally, the schedule may indicate the data transmission BW (e.g., shrunk or stretched).

Nodes on one channel may use the reduced bandwidth 506 if they use a different link direction from the detected nodes operating on the adjacent channel. In the scheme 500, the operators on adjacent channels C0 and C1 may or may not have their DL/UL transmission directions in alignment. For example, additional guard band 504 may be used when the link direction of two operators is not aligned across adjacent channels, when adjacent channel interference is detected. The scheme 500 may be further optimized if operators on adjacent channels are in DL/UL data transmission direction alignment by removing the additional guard band 504, as illustrated in FIG. 6.

FIG. 6 illustrates a priority-based adjacent channel sharing scheme 600 according to embodiments of the present disclosure. The scheme 600 may be employed by the network 100. In particular, a BS 105 or UE 115 may employ the scheme 600 to extend LBT across multiple operators sharing adjacent channels. While the scheme 600 illustrates coordinated spectrum access for four different network operating entities operating on adjacent channels, the scheme 600 can be applied to any suitable number of network operating entities. In the scheme 600, a guard band 602 is included at an edge of channels C0 and C1 to mitigate interference from simultaneous transmissions in the adjacent channels.

Operators operating on adjacent channels may be aware of the TDD DL/UL configuration of other operators. After the medium sensing, an operator may determine whether a higher priority operator grabbed the medium and also determine its planned TDD configuration for a TXOP. Each operator may have a semi-static TDD pattern and this information may be shared with other operators. Alternatively, a BS may obtain the TDD pattern using the RTS signal on the adjacent channel, where RTS can indicate the TDD pattern. In an example, the RTS signal indicates the TDD DL/UL configuration of a wireless communication device (e.g., BS or UE). Accordingly, the operator(s) may determine the link direction from the detected node(s) operating on the adjacent channel. Additionally, the nodes may coordinate with each other and agree to use a particular pattern for a time period (e.g., 100 ms). The particular pattern may change with each time period. In an example, the semi-static TDD pattern may vary every 100 ms. Accordingly, a lower priority node decides whether it will have the same or different data transmission direction alignment.

In the scheme 600, nodes on one channel use regular bandwidth if they use the same link direction from the detected nodes operating on the adjacent channel. In an example, operator C operating on channel C1 determines whether operator A's data transmission direction is in alignment with operator C's data transmission direction. Operators are aligned in terms of data transmission if they both transmit in the same direction (e.g., both transmit UL or both transmit DL). Operators are not aligned in terms of data transmission if they do not transmit in the same direction (e.g., operator A transmits UL and operator C transmits DL, or operator A transmits DL and operator C transmits UL). Data alignment may also refer to the operators using the same link direction.

If the data transmission of operators A and C are not in alignment, one node may use reduced bandwidth (see reduced BW 506 in FIG. 5), with the addition of the guard band 504. If, however, the data transmission of operators A and C are in alignment, additional guard band 504 may be unnecessary. In an example, each of the BWs of channels C0 and C1 is 20 MHz. Operator A may transmit using its full transmission BW of 20 MHz. If operator C uses the same link direction as operator A, operator C may use the transmission BW of 20 MHz. At a later point in time, operator C may decide to switch transmission to the other direction. In this scenario, operator C may add additional guard band 504. If operator C does not use the same link direction as operator A, operator C may use the reduced transmission BW (e.g., 10 MHz) and allow the additional guard band to use the other 10 MHz.

In some examples, in response to operator D sensing operator A, operator D transmits a communication signal with a reduced BW, the reduced BW providing an additional guard band to channel C0 and on channel C1. Additionally, in response to operator D not sensing operator A, operator D transmits the communication signal with a full BW, the full BW being greater than the reduced BW. If an operator transmits a signal with a full BW, the operator transmits the signal using the full BW allocated to a channel on which the operator operates. If an operator transmits a signal with a reduced BW, the operator transmits the signal using less than the full BW allocated to a channel on which the operator operates.

Figure 7A:
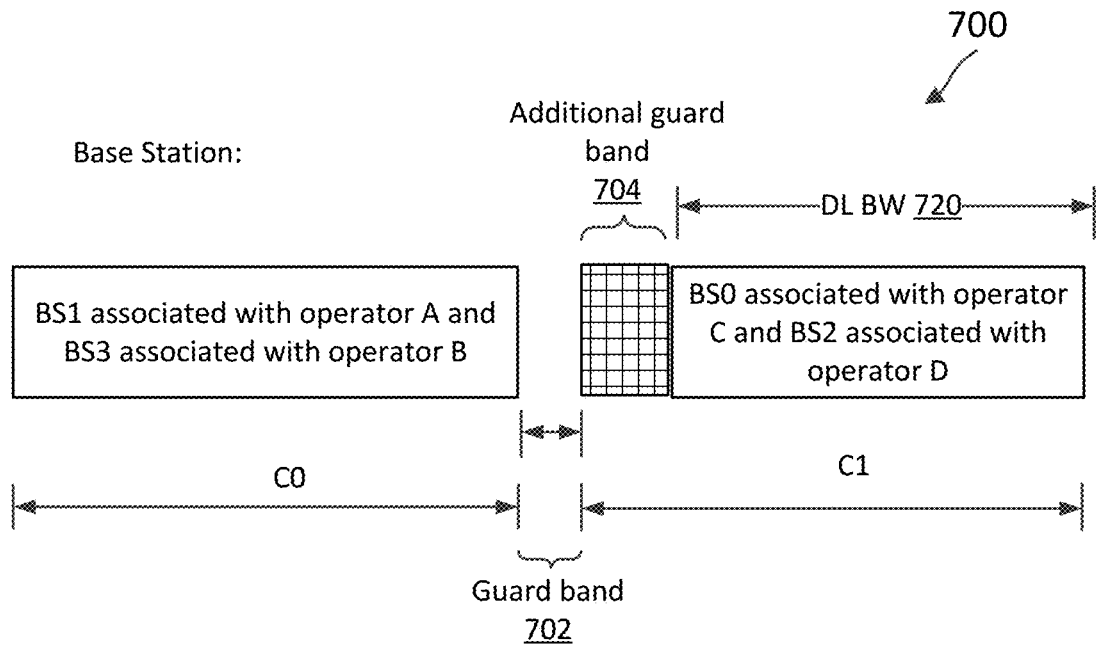
FIGS. 7A and 7B illustrate priority-based adjacent channel sharing schemes according to embodiments of the present disclosure.
Figure 7B:
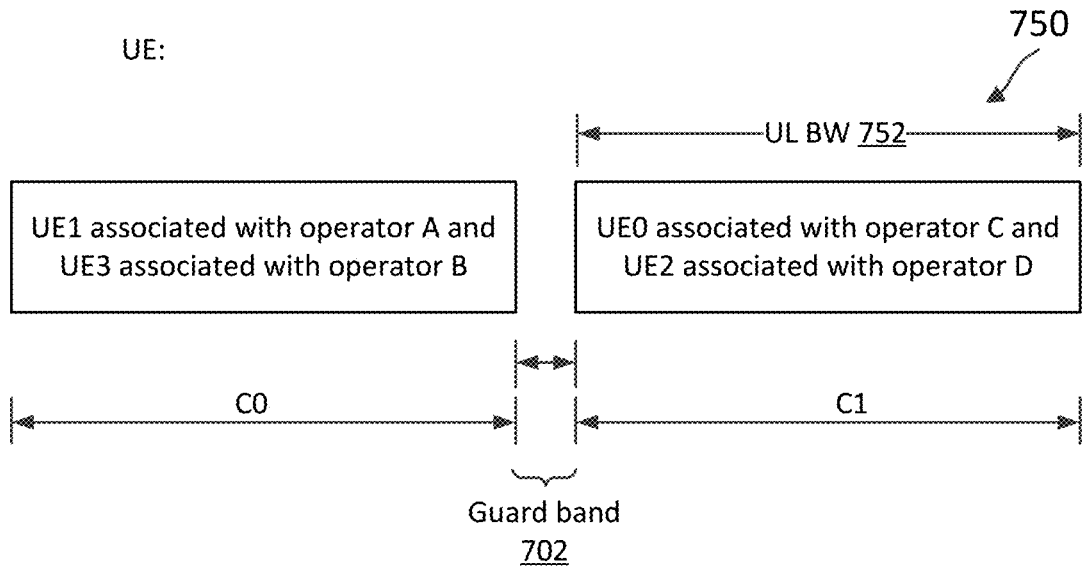

FIGS. 7A and 7B illustrate priority-based adjacent channel sharing schemes 700 and 750 according to embodiments of the present disclosure. The schemes 700 and 750 may be employed by the network 100. In particular, a BS 105 or UE 115 may employ the schemes 700 and 750 to extend LBT across multiple operators sharing adjacent channels. While the scheme 700 and 750 illustrates coordinated spectrum access for four different network operating entities operating on adjacent channels, the scheme 700 and 750 can be applied to any suitable number of network operating entities.

In the schemes 700 and 750, different UL and DL transmission BW may be provided on a channel if one or more nodes from an adjacent channel is detected. A DL BW 720 on channel C1 and an UL BW 752 on channel C1 may be different because the interference may be different on the BS and UE side. The UEs belong to a lower power class compared to the BSs. Accordingly, the adjacent channel interference may be more severe due to BS-to-BS interference and less detrimental due to UE-to-UE interference. The likelihood of a UE detecting another UE's CTS signal may be smaller compared to the likelihood of a BS detecting an RTS signal from another BS. Additionally, the likelihood of a UE detecting leakage from another UE's CTS signal may be smaller than the likelihood of the BS detecting leakage from another BS's RTS on an adjacent channel.

A guard band 702 is included at an edge of channels C0 and C1 to mitigate interference from simultaneous transmissions in the adjacent channels. Referring to the scheme 700, a BS0 associated with operator C may use a smaller bandwidth (e.g., DL BW 720) for transmission when detecting another BS from an adjacent channel (e.g., BS1 associated with operator A) while UE0 associated with operator C may use a larger bandwidth (e.g., UL BW 752) for transmission when not detecting UE1 or UE3 from adjacent channel C0. Operator A has a higher priority than operator C. In an example, BS1 associated with operator A transmits an RTS signal that is detected by BS0 associated with operator C. The BS0 detects the RTS signal from BS1 and transmits with a reduced DL BW 720 when they use different link directions.

In an example, BS1 uses the UL link direction. If BS0 uses the DL link direction, BS0's DL BW is smaller to reduce interference for BS 1's UL data reception. If, however, BS0 uses the UL link direction and accordingly is in transmission alignment with BS1, BS0 may transmit using the full BW. Although the reduced BW transmission is shown as being in the DL link direction in the scheme 700, it should also be understood that the reduced BW transmission may be in the UL link direction in other examples.

Referring to the scheme 750, if UE0 associated with operator C does not detect a CTS signal from UE1 associated with operator A operating on an adjacent channel C0, UE0 may transmit using the entire UL BW 752 (e.g., 20 MHz). Although the full BW transmission is shown as being in the UL link direction in the scheme 750, it should also be understood that the full BW transmission may be in the DL link direction in other examples.

Referring to the schemes 700 and 750, the BS may use a smaller BW for transmission than the UE. The UL reception on the additional guard band 704 (e.g., BWP1) in the channel C1 may be subject to a different interference level compared to the other bandwidth part (e.g., BWP2) in the channel C1. For example, the interference in the left-most portion next to channel C0 will be higher than the interference in the right-most portion of the channel. Additionally, a BS may schedule different UEs on different BWPs to reflect the different interference levels. The BS may use reduced bandwidth for transmission when the link direction is not aligned, while the UE may use a wider bandwidth.

Figure 8:
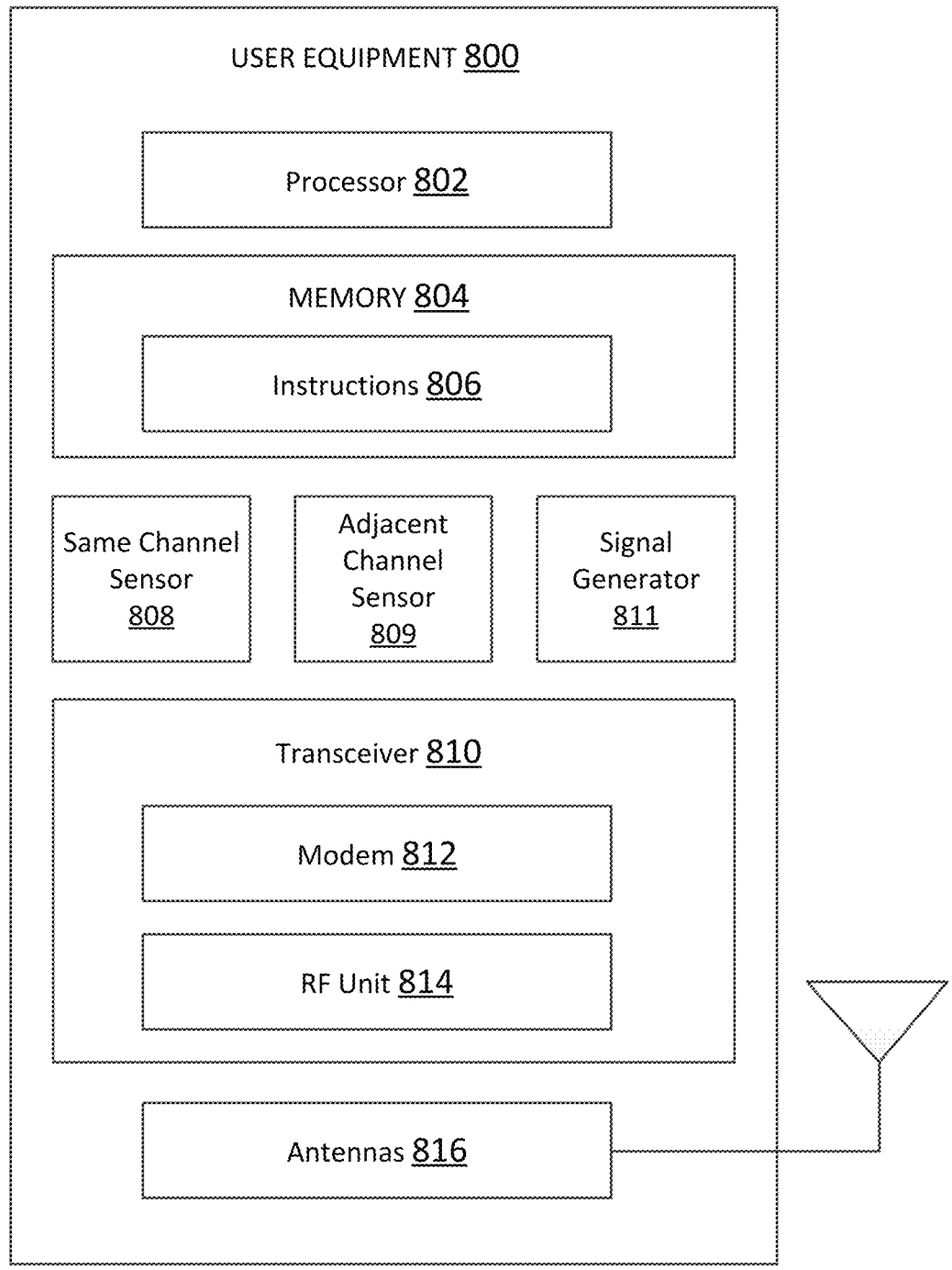
FIG. 8 is a block diagram of an exemplary user equipment (UE) according to embodiments of the present disclosure.

FIG. 8 is a block diagram of an exemplary UE 800 according to embodiments of the present disclosure. The UE 800 may be a UE 115 as discussed above. As shown, the UE 800 may include a processor 802, a memory 804, a same channel sensor 808, an adjacent channel sensor 809, a signal generator 811, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with embodiments of the present disclosure. Instructions 806 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the same channel sensor 808, adjacent channel sensor 809, and signal generator 811 may be implemented via hardware, software, or combinations thereof. For example, each of the same channel sensor 808, adjacent channel sensor 809, and signal generator 811 may be implemented as a processor, circuit, and/or instructions 806 stored in the memory 804 and executed by the processor 802. Each of the same channel sensor 808, adjacent channel sensor 809, and signal generator 811 may be used for various aspects of the present disclosure.

In an example, the same channel sensor 808, adjacent channel sensor 809, and the signal generator are incorporated in a first wireless communication device. The same channel sensor 808 is configured to perform a first sensing in a first sensing time designated for a first channel. The first channel is an operational channel of the first wireless communication device. The adjacent channel sensor 809 is configured to perform a second sensing in a second sensing time designated for a second channel adjacent to the first channel. The second channel is an operational channel of a second wireless communication device. The signal generator 811 is configured to communicate, with a third wireless communication device in the first channel, a communication signal in the first channel based on the first and second sensing.

In an example, the first wireless communication device is a UE1 of an operator A, and UE1 shares a first channel C0 with UE3. The second wireless communication device is a UE2 of an operator B that is operating on an adjacent channel C1 to channel C0. UE1 performs the first sensing by listening for UE3-to-UE1 interference on channel C0 and performs the second sensing by listening for UE2-to-UE1 interference on the adjacent channel C1. UE1 may communicate with a BS a communication signal (e.g., a PBCH signal, a PDCCH signal and/or a PDSCH signal for DL, or a PUCCH signal or PUSCH signal for UL) in channel C0 based on the first sensing and the second sensing.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804, according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

Figure 9:
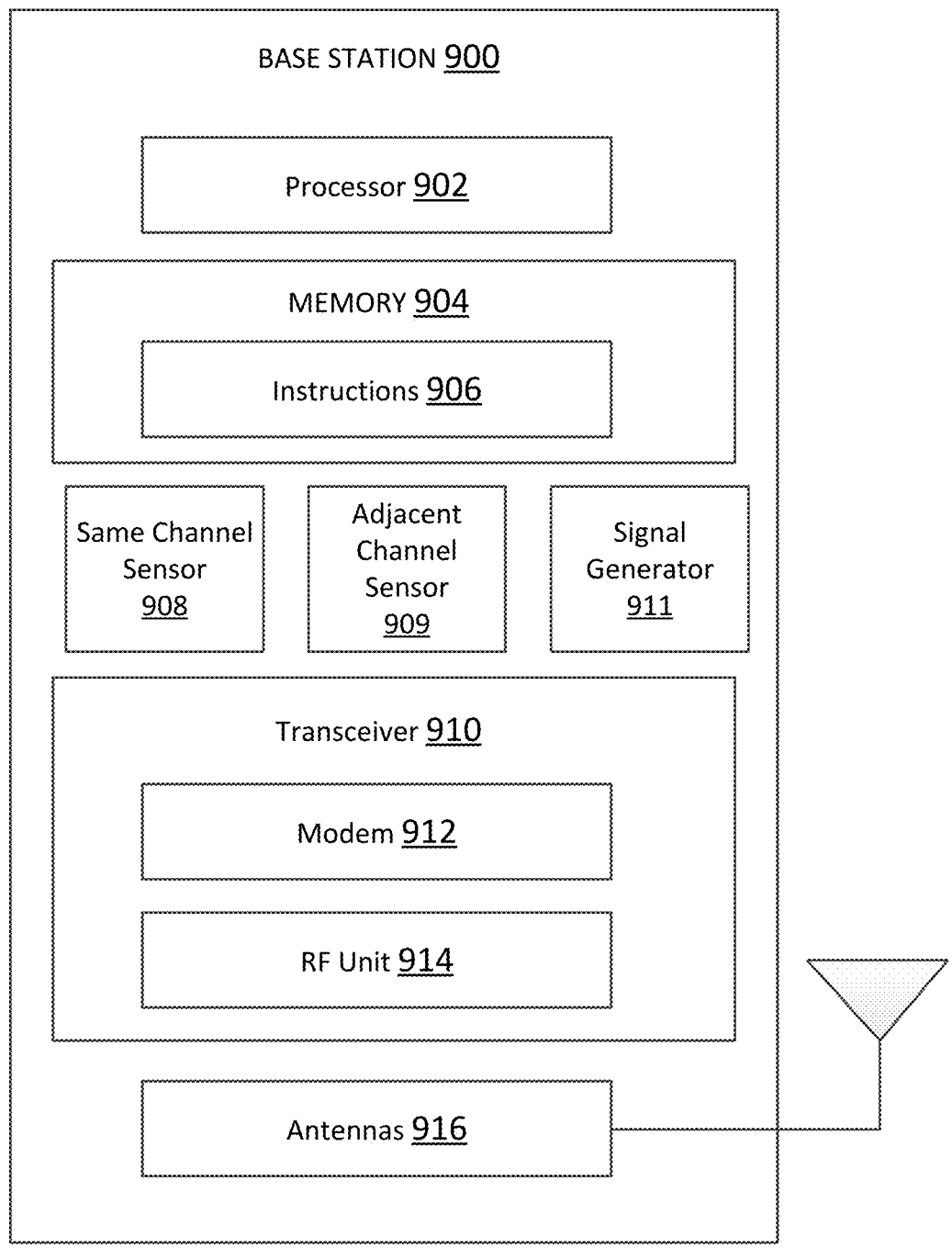
FIG. 9 is a block diagram of an exemplary base station (BS) according to embodiments of the present disclosure.

FIG. 9 is a block diagram of an exemplary BS 900 according to embodiments of the present disclosure. The BS 900 may be a BS 105 as discussed above. As shown, the BS 900 may include a processor 902, a memory 904, a same channel sensor 908, an adjacent channel sensor 909, a signal generator 911, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 904 may include a non-transitory computer-readable medium. The memory 904 may store instructions 906. The instructions 906 may include instructions that, when executed by the processor 902, cause the processor 902 to perform operations described herein. Instructions 906 may also be referred to as code, which may be interpreted broadly to include any type of computer-readable statement(s) as discussed above with respect to FIG. 8.

Each of the same channel sensor 908, adjacent channel sensor 909, and signal generator 911 may be implemented via hardware, software, or combinations thereof. For example, each of the same channel sensor 908, adjacent channel sensor 909, and signal generator 911 may be implemented as a processor, circuit, and/or instructions 906 stored in the memory 904 and executed by the processor 902. Each of the same channel sensor 908, adjacent channel sensor 909, and signal generator 911 may be used for various aspects of the present disclosure.

In an example, the same channel sensor 908, adjacent channel sensor 909, and signal generator 911 are incorporated in a first wireless communication device. The same channel sensor 908 is configured to perform a first sensing in a first sensing time designated for a first channel. The first channel is an operational channel of the first wireless communication device. The adjacent channel sensor 909 is configured to perform a second sensing in a second sensing time designated for a second channel adjacent to the first channel. The second channel is an operational channel of a second wireless communication device. The signal generator 911 is configured to communicate, with a third wireless communication device in the first channel, a communication signal in the first channel based on the first and second sensing.

In an example, the first wireless communication device is a BS1 of an operator A, and BS1 shares a first channel C0 with BS3. The second wireless communication device is a BS2 of an operator B that is operating on an adjacent channel C1 to channel C0. BS1 performs the first sensing by listening for BS3-to-BS1 interference on channel C0 and performs the second sensing by listening for BS2-to-BS1 interference on the adjacent channel C1. BS1 may communicate with a UE a communication signal (e.g., a PBCH signal, a PDCCH signal and/or a PDSCH signal for DL, or a PUCCH signal or PUSCH signal for UL) in channel C0 based on the first sensing and the second sensing.

As shown, the transceiver 910 may include the modem subsystem 912 and the RF unit 914. The transceiver 910 can be configured to communicate bi-directionally with other devices, such as the UEs 115 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or 800. The RF unit 914 may be further configured to perform analog beamforming in conjunction with the digital beamforming. Although shown as integrated together in transceiver 910, the modem subsystem 912 and the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The antennas 916 may include multiple antennas of similar or different designs in order to sustain multiple transmission links.

Figure 10:
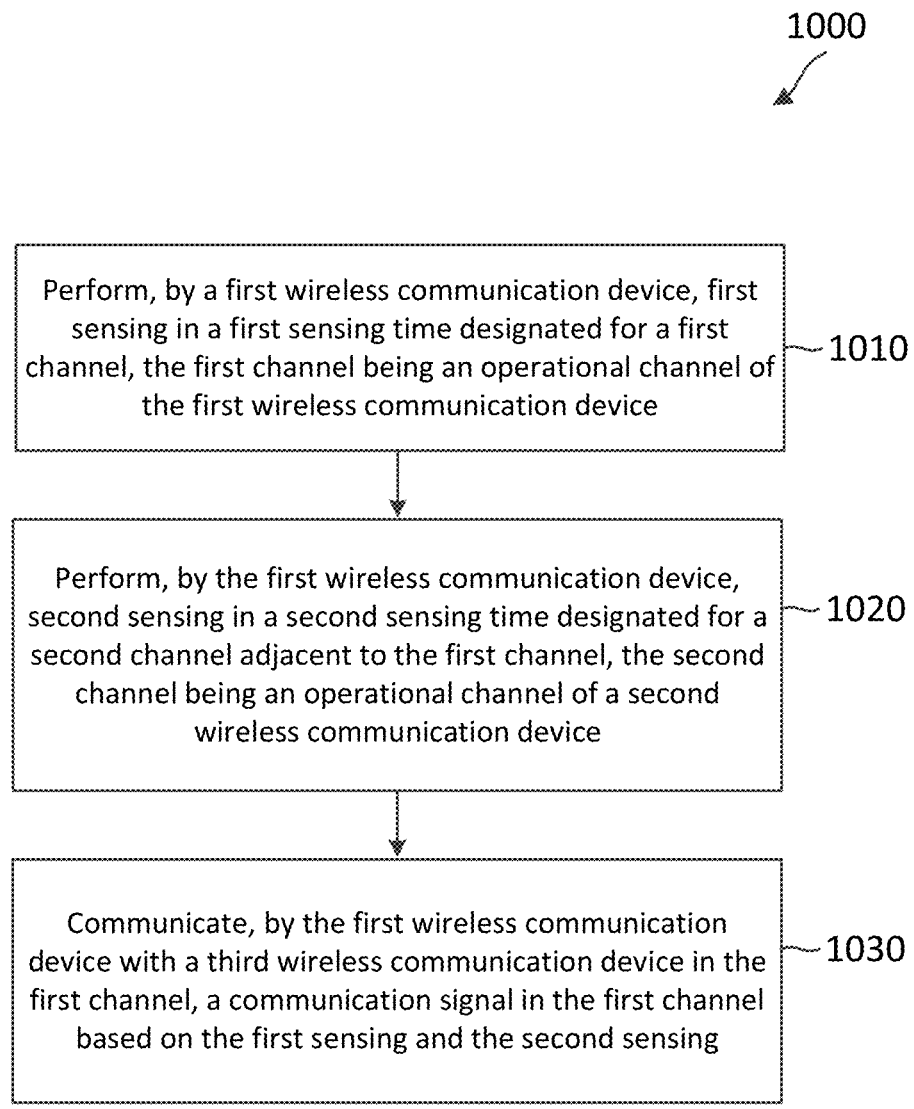
FIG. 10 is a flow diagram of a spectrum sharing communication method according to embodiments of the present disclosure.

FIG. 10 is a flow diagram of a spectrum sharing communication method 1000 according to embodiments of the present disclosure. Steps of the method 1000 can be executed by a computing device (e.g., a processor, processing circuit, and/or other suitable component) or other suitable means for performing the steps. For example, a UE, such as the UE 115, the UE 215, or the UE 800, may utilize one or more components, such as the processor 802, the memory 804, the same channel sensor 808, the adjacent channel sensor 809, the signal generator 811, or the transceiver 810, to execute the steps of method 1000. In another example, a BS, such as the BS 105, the BS 205, or the BS 900, may utilize one or more components, such as the processor 902, the memory 904, the same channel sensor 908, the adjacent channel sensor 909, the signal generator 911, or the transceiver 910, to execute the steps of method 1000. The method 1000 may employ similar mechanisms as in the schemes 300, 400, 500, 600, and 700. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes performing, by a first wireless communication device, first sensing in a first sensing time designated for a first channel, the first channel being an operational channel of the first wireless communication device. In an example, the first wireless communication device may correspond to a BS1 that senses the medium at a time T1 designated for a channel C0. BS1 and BS2 share channel C0, and BS1 may listen for an RTS signal from BS2. In another example, the first wireless communication device may correspond to a UE1 that senses the medium at a time T1 designated for a channel C0. UE1 and UE2 share channel C0, and UE1 may listen for a CTS signal from UE2.

At step 1020, the method 1000 includes performing, by the first wireless communication device, second sensing in a second sensing time designated for a second channel adjacent to the first channel, the second channel being an operational channel of a second wireless communication device. In an example, the first wireless communication device may correspond to BS1 that senses the medium at a time T2 designated for channel C1, which is adjacent to the channel C0. The second wireless communication device may be BS3, and B1 may listen for an RTS signal from BS3. In another example, the first wireless communication device may correspond to UE1 that senses the medium at a time T2 designated for channel C1, which is adjacent to the channel C0. The second wireless communication device may be UE3, and UE1 may listen for a CTS signal from UE3.

At step 1030, the method 1000 includes communicating, by the first wireless communication device with a third wireless communication device in the first channel, a communication signal in the first channel based on the first sensing and the second sensing. In an example, the first wireless communication device may correspond to BS1 that communicates with the UE1, which both operate on channel C0. In an example, the first wireless communication device may correspond to UE1 that communicates with the BS1, which both operate on channel C0. The communication signal may be a PBCH signal, a PDCCH signal and/or a PDSCH signal for DL, or a PUCCH signal or PUSCH signal for UL.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further, embodiments of the present disclosure include a method of wireless communication, including performing, by a first wireless communication device, first sensing in a first sensing time designated for a first channel, the first channel being an operational channel of the first wireless communication device; performing, by the first wireless communication device, second sensing in a second sensing time designated for a second channel adjacent to the first channel, the second channel being an operational channel of a second wireless communication device; and communicating, by the first wireless communication device with a third wireless communication device in the first channel, a communication signal in the first channel based on the first sensing and the second sensing.

In some embodiments, a frequency band is partitioned into a plurality of channels including the first and second channels. In some embodiments, the first wireless communication device is a first BS, the second wireless communication device is a second BS, and the third wireless communication device is a UE, the method further including detecting, based on performing the second sensing, an RTS signal from the second BS. In some embodiments, the first wireless communication device is a first UE, the second wireless communication device is a second UE, and the third wireless communication device is a BS, the method further including detecting, based on performing the second sensing, a CTS signal from the second UE. In some embodiments, the first wireless communication device is a first BS, and the second wireless communication device is a second BS, the method further including detecting, based on performing the second sensing, an energy signal from the second BS.

In some embodiments, the second channel has a higher priority than the first channel. In some embodiments, performing the second sensing includes using a medium sensing slot to gain access to a TXOP, and each TXOP including one or more medium sensing slots followed by a transmission period. In an example, each medium sensing slot includes an RTS signal, a gap for a DL and an UL switching time and processing time, a CTS signal, and a gap between transmission of the RTS and CTS signals. In another example, each medium sensing slot includes a DL/UL switching gap between a first RTS signal from the first channel and a second RTS signal from the second channel. In some embodiments, the DL/UL switching gap includes a time period between switching from a DL transmission direction to an UL transmission direction. In some embodiments, the DL/UL switching gap includes a time period between switching from an UL transmission direction to a DL transmission direction. In another example, each medium sensing slot includes a DL/UL switching gap that is between a first CTS signal from the first channel and a second CTS signal from the second channel. In some embodiments, the DL/UL switching gap includes a time period between switching from a DL transmission direction to an UL transmission direction. In some embodiments, the DL/UL switching gap includes a time period between switching from an UL transmission direction to a DL transmission direction.

In some embodiments, the communication signal is at least one of a PBCH signal, a PDCCH signal, or a PDSCH signal in a DL transmission direction. In some embodiments, the communication signal is at least one of a PUCCH signal or a PUSCH signal in an UL transmission direction. In some embodiments, the method further includes in response to sensing the second wireless communication device during the second sensing time, transmitting, by the first wireless communication device, the communication signal with a reduced BW, the reduced BW providing an additional guard band on the first channel. In some embodiments, the method further includes in response to not sensing the second wireless communication device during the second sensing time, transmitting, by the first wireless communication device, the communication signal with a full BW, the full BW being greater than the reduced BW.

In some embodiments, the method further includes in response to sensing the second wireless communication device during the second sensing time, determining whether a first transmission link direction of the first wireless communication device is the same as a second transmission link direction of the second wireless communication device. In some embodiments, the method further includes in response to a determination that the first transmission link direction is the same as the second transmission link direction, transmitting, by the first wireless communication device, the communication signal with a full BW; and in response to a determination that the first transmission link direction is not the same as the second transmission link direction, transmitting, by the first wireless communication device, the communication signal with a reduced BW, the reduced BW providing an additional guard band on the first channel, and the full BW being greater than the reduced BW.

In some embodiments, the method further includes determining, by the first wireless communication device, a first time-division duplex (TDD) DL/UL configuration of the second wireless communication device; and detecting, based on performing the second sensing, an RTS signal from the second wireless communication device, the RTS signal indicating the first TDD DL/UL configuration of the second wireless communication device. In an example, each of the first and second wireless communication devices has a semi-static TDD pattern. In another example, the first TDD DL/UL configuration of the second wireless communication device includes the second transmission link direction of the second wireless communication device, and a second TDD DL/UL configuration of the first wireless communication device includes the first transmission link direction of the first wireless communication device.

In some embodiments, the method further includes sensing the second wireless communication device during the second sensing time. In an example, the first wireless communication device is a first BS, the second wireless communication device is a second BS, and the third wireless communication device is a UE. In another example, the first wireless communication device is a first UE, the second wireless communication device is a second UE, and the third wireless communication device is a BS. In some embodiments, a transmission BW of the first wireless communication device is different from a transmission BW of the third wireless communication device. In an example, the first wireless communication device is a first BS, the second wireless communication device is a second BS, and the third wireless communication device is a UE, the method further including in response to sensing the second wireless communication device during the second sensing time, transmitting, by the first wireless communication device, the communication signal with a DL transmission BW, an UL transmission BW of the third wireless communication device being greater than the DL transmission BW, and the DL transmission BW providing an additional guard band on the first channel. In another example, the first wireless communication device is a first UE, the second wireless communication device is a second UE, and the third wireless communication device is a BS, the method further including in response to not sensing the second wireless communication device during the second sensing time, transmitting, by the first wireless communication device, the communication signal with a full transmission BW, the full BW being greater than a DL transmission BW of the third wireless communication device, and the DL transmission BW providing an additional guard band on the first channel.

In some embodiments, the first wireless communication device is a first BS, the second wireless communication device is a second BS, and the third wireless communication device is a UE, the method further including: in response to sensing the second wireless communication device during the second sensing time, determining whether a first transmission link direction of the first wireless communication device is the same as a second transmission link direction of the second wireless communication device; in response to a determination that the first transmission link direction is the same as the second transmission link direction, transmitting, by the first wireless communication device, the communication signal with a full BW; and in response to a determination that the first transmission link direction is not the same as the second transmission link direction, transmitting, by the first wireless communication device, the communication signal with a DL transmission BW, an UL transmission BW of the third wireless communication device being greater than the DL transmission BW, and the DL transmission BW providing an additional guard band on the first channel, wherein the first and third wireless communication devices transmit with the same transmission BW if the first and second transmission links are the same, and the first and third wireless communication devices transmit with different transmission BWs if the first and second transmission links are not the same.

Further embodiments of the present disclosure include an apparatus including a processor configured to: perform first sensing in a first sensing time designated for a first channel, wherein the first channel is an operational channel of a first wireless communication device; and perform second sensing in a second sensing time designated for a second channel adjacent to the first channel, wherein the second channel is an operational channel of a second wireless communication device; and a transceiver configured to communicate, with a third wireless communication device in the first channel, a communication signal in the first channel based on the first sensing and the second sensing.

In some embodiments, the transceiver is configured to in response to sensing the second wireless communication device during the second sensing time, transmit the communication signal with a reduced bandwidth (BW), wherein the reduced BW provides an additional guard band on the first channel. In some embodiments, the transceiver is configured to in response to not sensing the second wireless communication device during the second sensing time, transmit the communication signal with a full BW, wherein the full BW is greater than the reduced BW. In some embodiments, the transceiver is configured to in response to sensing the second wireless communication device during the second sensing time, determine whether a first transmission link direction of the first wireless communication device is the same as a second transmission link direction of the second wireless communication device.

In some embodiments, the transceiver is configured to in response to a determination that the first transmission link direction is the same as the second transmission link direction, transmit the communication signal with a full BW; and in response to a determination that the first transmission link direction is not the same as the second transmission link direction, transmit the communication signal with a reduced BW, wherein the reduced BW provides an additional guard band on the first channel, and the full BW is greater than the reduced BW. In an example, the processor is configured to determine a first TDD DL/UL configuration of the second wireless communication device, and the transceiver is configured to detect, based on the second sensing, an RTS signal from the second wireless communication device, where the RTS signal indicates the first TDD DL/UL configuration of the second wireless communication device.

In some embodiments, each of the first and second wireless communication devices has a semi-static TDD pattern. In some embodiments, the first TDD DL/UL configuration of the second wireless communication device includes the second transmission link direction of the second wireless communication device, and a second TDD DL/UL configuration of the first wireless communication device includes the first transmission link direction of the first wireless communication device. In some embodiments the transceiver is configured to sense the second wireless communication device during the second sensing time. In an example, the first wireless communication device is a first BS, the second wireless communication device is a second BS, and the third wireless communication device is a UE. In another example, the first wireless communication device is a first UE, the second wireless communication device is a second UE, and the third wireless communication device is a BS.

In some embodiments, a transmission BW of the first wireless communication device is different from a transmission BW of the third wireless communication device. In an example, the first wireless communication device is a first BS, the second wireless communication device is a second BS, and the third wireless communication device is a UE, and the transceiver is configured to in response to sensing the second wireless communication device during the second sensing time, transmit, by the first wireless communication device, the communication signal with a DL transmission BW, wherein an UL transmission BW of the third wireless communication device is greater than the DL transmission BW, and the DL transmission BW provides an additional guard band on the first channel. In another example, the first wireless communication device is a first UE, the second wireless communication device is a second UE, and the third wireless communication device is a BS, and the transceiver is configured to in response to not sensing the second wireless communication device during the second sensing time, transmit, by the first wireless communication device, the communication signal with a full transmission BW, wherein the full BW is greater than a DL transmission BW of the third wireless communication device, and the DL transmission BW provides an additional guard band on the first channel.

In some embodiments, the first wireless communication device is a first BS, the second wireless communication device is a second BS, and the third wireless communication device is a UE, wherein the processor is configured to in response to sensing the second wireless communication device during the second sensing time, determine whether a first transmission link direction of the first wireless communication device is the same as a second transmission link direction of the second wireless communication device, wherein the transceiver is configured to in response to a determination that the first transmission link direction is the same as the second transmission link direction, transmit the communication signal with a full BW, and wherein the transceiver is configured to in response to a determination that the first transmission link direction is not the same as the second transmission link direction, transmit the communication signal with a DL transmission BW, wherein an UL transmission BW of the third wireless communication device is greater than the DL transmission BW, the DL transmission BW provides an additional guard band on the first channel, and wherein the first and third wireless communication devices transmit with the same transmission BW if the first and second transmission links are the same, and the first and third wireless communication devices transmit with different transmission BWs if the first and second transmission links are not the same.

Further embodiments of the present disclosure include a computer-readable medium having program code recorded thereon, the program code including: code for causing a first wireless communication device to perform first sensing in a first sensing time designated for a first channel, the first channel being an operational channel of the first wireless communication device; code for causing a first wireless communication device to perform second sensing in a second sensing time designated for a second channel adjacent to the first channel, the second channel being an operational channel of a second wireless communication device; and code for causing the first wireless communication device to communicate, with a third wireless communication device in the first channel, a communication signal in the first channel based on the first sensing and the second sensing.

Further embodiments of the present disclosure include an apparatus including means for performing first sensing in a first sensing time designated for a first channel, the first channel being an operational channel of a first wireless communication device; means for performing second sensing in a second sensing time designated for a second channel adjacent to the first channel, the second channel being an operational channel of a second wireless communication device; and means for communicating, with a third wireless communication device in the first channel, a communication signal in the first channel based on the first sensing and the second sensing.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   performing, by a first wireless communication device, first sensing in a first sensing time designated for a first channel, the first channel being an operational channel of the first wireless communication device;
   performing, by the first wireless communication device, second sensing in a second sensing time designated for a second channel adjacent to the first channel, the second channel being an operational channel of a second wireless communication device;
   detecting, based on performing the second sensing, a request-to-transmit (RTS) signal indicating a first time-division duplex (TDD) uplink (UL)/downlink (DL) configuration of the second wireless communication device, wherein each of the first and second wireless communication devices has a semi-static TDD pattern; and
   communicating, by the first wireless communication device with a third wireless communication device in the first channel, a communication signal in the first channel based on the first sensing and the second sensing.

2. The method of claim 1, wherein a frequency band is partitioned into a plurality of channels including the first and second channels.

3. The method of claim 1, further comprising:
   detecting, based on performing the second sensing, an energy signal from the second wireless communication device, wherein the performing the second sensing is based on at least one of a signal detection or an energy detection.

4. The method of claim 1, wherein the second channel has a higher priority than the first channel.

5. The method of claim 1, wherein performing the second sensing includes using a medium sensing slot to gain access to a transmission opportunity (TXOP), and each TXOP includes one or more medium sensing slots followed by a transmission period.

6. The method of claim 5, wherein each medium sensing slot includes the RTS signal, a gap for a downlink (DL) and an uplink (UL) switching time and processing time, a clear to transmit (CTS) signal, and a gap between transmission of the RTS and CTS signals.

7. The method of claim 5, wherein each medium sensing slot includes a DL/UL switching gap between a first RTS signal from the first channel and a second RTS signal from the second channel.

8. The method of claim 7, wherein the DL/UL switching gap includes a time period between switching from a DL transmission direction to an UL transmission direction or includes a time period between switching from the UL transmission direction to the DL transmission direction.

9. The method of claim 5, wherein each medium sensing slot includes a DL/UL switching gap that is between a first clear to transmit (CTS) signal from the first channel and a second CTS signal from the second channel.

10. The method of claim 9, wherein the DL/UL switching gap includes a time period between switching from a DL transmission direction to an UL transmission direction or includes a time period between switching from the UL transmission direction to the DL transmission direction.

11. The method of claim 1, further comprising:
in response to sensing the second wireless communication device during the second sensing time, transmitting, by the first wireless communication device, the communication signal with a reduced bandwidth (BW), the reduced BW providing an additional guard band on the first channel.

12. The method of claim 11, further comprising:
in response to not sensing the second wireless communication device during the second sensing time, transmitting, by the first wireless communication device, the communication signal with a full BW, the full BW being greater than the reduced BW.

13. The method of claim 1, further comprising:
in response to sensing the second wireless communication device during the second sensing time, determining whether a first transmission link direction of the first wireless communication device is the same as a second transmission link direction of the second wireless communication device.

14. The method of claim 13, further comprising:
in response to a determination that the first transmission link direction is the same as the second transmission link direction, transmitting, by the first wireless communication device, the communication signal with a full BW; and
in response to a determination that the first transmission link direction is not the same as the second transmission link direction, transmitting, by the first wireless communication device, the communication signal with a reduced BW, the reduced BW providing an additional guard band on the first channel, and the full BW being greater than the reduced BW.

15. The method of claim 14, wherein the TDD DL/UL configuration of the second wireless communication device includes the second transmission link direction of the second wireless communication device, and a second TDD DL/UL configuration of the first wireless communication device includes the first transmission link direction of the first wireless communication device.

16. The method of claim 1, wherein a transmission BW of the first wireless communication device is different from a transmission BW of the third wireless communication device.

17. The method of claim 16, further comprising:
in response to sensing the second wireless communication device during the second sensing time, transmitting, by the first wireless communication device, the communication signal with a first transmission BW of the first wireless communication device, a second transmission BW of the third wireless communication device being greater than the first transmission BW, and the first transmission BW providing an additional guard band on the first channel; and
in response to not sensing the second wireless communication device during the second sensing time, transmitting, by the first wireless communication device, the communication signal with a full BW, the full BW being greater than a third transmission BW of the third wireless communication device, and the third transmission BW providing an additional guard band on the first channel.

18. The method of claim 1, further comprising:
in response to sensing the second wireless communication device during the second sensing time, determining whether a first transmission link direction of the first wireless communication device is the same as a second transmission link direction of the second wireless communication device;
in response to a determination that the first transmission link direction is the same as the second transmission link direction, transmitting, by the first wireless communication device, the communication signal with a full BW; and
in response to a determination that the first transmission link direction is not the same as the second transmission link direction, transmitting, by the first wireless communication device, the communication signal with a DL transmission BW, an UL transmission BW of the third wireless communication device being greater than the DL transmission BW, and the DL transmission BW providing an additional guard band on the first channel,
wherein the first and third wireless communication devices transmit with the same transmission BW if the first and second transmission link directions are the same, and the first and third wireless communication devices transmit with different transmission BWs if the first and second transmission link directions are not the same.

19. An apparatus comprising:
a processor configured to:
perform first sensing in a first sensing time designated for a first channel, wherein the first channel is an operational channel of a first wireless communication device; and
perform second sensing in a second sensing time designated for a second channel adjacent to the first channel, wherein the second channel is an operational channel of a second wireless communication device;
detect, based on performing the second sensing, a request-to-transmit (RTS) signal indicating a first time-division duplex (TDD) uplink (UL)/downlink (DL) configuration of the second wireless communication device, wherein each of the first and second wireless communication devices has a semi-static TDD pattern; and a transceiver configured to communicate, with a third wireless communication device in the first channel, a communication signal in the first channel based on the first sensing and the second sensing.

20. The apparatus of claim 19, wherein the transceiver is configured to:
in response to sensing the second wireless communication device during the second sensing time, transmit the communication signal with a reduced bandwidth (BW), wherein the reduced BW provides an additional guard band on the first channel.

21. The apparatus of claim 20, wherein the transceiver is configured to:
in response to not sensing the second wireless communication device during the second sensing time, transmit the communication signal with a full BW, wherein the full BW is greater than the reduced BW.

22. The apparatus of claim 19, wherein the processor is configured to:
in response to sensing the second wireless communication device during the second sensing time, determine whether a first transmission link direction of the first wireless communication device is the same as a second transmission link direction of the second wireless communication device.

23. The apparatus of claim 19, wherein a transmission BW of the first wireless communication device is different from a transmission BW of the third wireless communication device.

24. The apparatus of claim 19,
wherein the processor is configured to in response to sensing the second wireless communication device during the second sensing time, determine whether a first transmission link direction of the first wireless communication device is the same as a second transmission link direction of the second wireless communication device,
wherein the transceiver is configured to in response to a determination that the first transmission link direction is the same as the second transmission link direction, transmit the communication signal with a full BW, and wherein the transceiver is configured to in response to a determination that the first transmission link direction is not the same as the second transmission link direction, transmit the communication signal with a DL transmission BW,
wherein an UL transmission BW of the third wireless communication device is greater than the DL transmission BW, the DL transmission BW provides an additional guard band on the first channel, and wherein the first and third wireless communication devices transmit with the same transmission BW if the first and second transmission links are the same, and the first and third wireless communication devices transmit with different transmission BWs if the first and second transmission links are not the same.

25. A non-transitory computer-readable medium having program code recorded thereon, the program code comprising:
code for causing a first wireless communication device to perform first sensing in a first sensing time designated for a first channel, the first channel being an operational channel of the first wireless communication device;
code for causing the first wireless communication device to perform second sensing in a second sensing time designated for a second channel adjacent to the first channel, the second channel being an operational channel of a second wireless communication device;
code for causing the first wireless communication device to detect, based on performing the second sensing, a request-to-transmit (RTS) signal indicating a first time-division duplex (TDD) uplink (UL)/downlink (DL) configuration of the second wireless communication device wherein each of the first and second wireless communication devices has a semi-static TDD pattern; and
code for causing the first wireless communication device to communicate, with a third wireless communication device in the first channel, a communication signal in the first channel based on the first sensing and the second sensing.

26. An apparatus comprising:
means for performing first sensing in a first sensing time designated for a first channel, the first channel being an operational channel of a first wireless communication device;
means for performing second sensing in a second sensing time designated for a second channel adjacent to the first channel, the second channel being an operational channel of a second wireless communication device;
means for detecting, based on the means for performing the second sensing, a request-to-transmit (RTS) signal indicating a first time-division duplex (TDD) uplink (UL)/downlink (DL) configuration of the second wireless communication device, wherein each of the first and second wireless communication devices has a semi-static TDD pattern; and
means for communicating, with a third wireless communication device in the first channel, a communication signal in the first channel based on the first sensing and the second sensing.

* * * * *